United States Patent [19]
Moran et al.

[11] Patent Number: 6,014,662
[45] Date of Patent: Jan. 11, 2000

[54] CONFIGURABLE BRIEFING PRESENTATIONS OF SEARCH RESULTS ON A GRAPHICAL INTERFACE

[75] Inventors: Michael Edward Moran, Ridgewood, N.J.; Jeffrey Stephen Schaffer, Ridgefield, Conn.

[73] Assignee: International Business Machines Corporation, Armonk, N.Y.

[21] Appl. No.: 08/979,806

[22] Filed: Nov. 26, 1997

[51] Int. Cl.[7] .................................................. G06F 17/30
[52] U.S. Cl. ..................................... 707/3; 707/4; 707/10
[58] Field of Search ............................. 707/7, 203, 103, 707/3, 4, 10

[56] References Cited

U.S. PATENT DOCUMENTS

| | | | |
|---|---|---|---|
| 3,700,264 | 10/1972 | Friedman | 283/38 |
| 4,437,685 | 3/1984 | Valencia | 281/42 |
| 5,442,795 | 8/1995 | Levine et al. | 395/800 |
| 5,500,929 | 3/1996 | Dickinson | 395/160 |
| 5,819,295 | 10/1998 | Nakagawa et al. | 707/203 |
| 5,832,470 | 11/1998 | Morita et al. | 707/1 |

*Primary Examiner*—Thomas G. Black
*Assistant Examiner*—Frantz Coby
*Attorney, Agent, or Firm*—Steven Meyers

[57] ABSTRACT

A user interface is provided that performs much of the work in searching and organizing of search data. It defines search terms and sources ahead of time for subjects that have wide usage, or are suggested by the user. It then organizes collections of search documents pertaining to a selected subject into a book divided into sections according to topics about the subject. Each section of the book is represented by a tab on the book that can be used to select between the various topics in the book. The books can be used to organize information from numerous sources about any number of subjects including companies, products, industries, geographies and people. Standard books can be personalized to fit the users need. For example, the content and organization of a book on a company can be changed depending on whether the user of the book owns the company's stock, competes with the company, or sells products to it. Preferably, the books are automatically updated with an update event occurs, and provide an indication on the screen that an event has occurred.

23 Claims, 13 Drawing Sheets

FIG. 7

FEATURED ARTICLES

INTERNATIONAL BUSINESS MAC...

BUSINESS WEEK, FEB. 12-GERSTNER GOES FOR GROWTH: THE NEW IBM

TIME, JAN. 11-IBM, A NEW FORCE IN THE INTERNET BUSINESS

MONEY JAN. 15-GOOD BETS IN THE BLUE CHIPS: IBM AND AT&T

INFORMATION WEEK FEB. 6-IBM CAUGHT IN WEB

DETERNATION JAN. 27-IBM BOLTS BACK

INFOWORLD JAN. 30-WEBMASTERS GET CONTENT WITH IBM'S DATABOLTS

WEB WEEK FEB. 4-NEW TOOLS TO KEEP 'EM COMING BACK: IBM'S DATABOLTS

PCWEEK JAN. 12-IBM'S APTIVA TAKES HONORS

DATABASE JAN. 19-DB2 KEEPS MAINFRAMES VITAL

INFOWORLD FEB. 10-DOMINO BROADCAST MAKES DATABASE PUBLISHING ON WEB EASY

LAST VIEWED: 11/28/97

*Tabs: NEWS, FEATURES, ON THE WEB, STOCK, REPORTS, DOCUMENTS*

6,014,662

CONFIGURABLE BRIEFING PRESENTATIONS OF SEARCH RESULTS ON A GRAPHICAL INTERFACE

RELATED PATENT APPLICATIONS

U.S. patent application Ser. No. #08/979,861 filed Nov. 26, 1997 and entitled "Method and System For Providing Access to Categorized Information From Online Internet and Intranet Sources."

FIELD OF THE INVENTION

This invention relates to graphical interfaces. More specifically, the invention relates to organization of search results, current awareness information, and other document references on graphical interfaces.

BACKGROUND OF THE INVENTION

There has been a proliferation of business and technical information from an ever increasing number of sources. Businesses have a vested interest in making this information available to their employees and their customers. Few have been able to do so, however because it is difficult to provide the desired information without requiring excessive effort by the recipient or overwhelming the recipient with extraneous information.

Part of the problem is caused by the way literature searches are performed in present day text searching systems and current awareness systems. Most text searching systems are based on searching for particular words. These systems are difficult to formulate a precise search query because of the number of ways the searched for information may be expressed in the searched text base, and the multiple different meanings that can be applied to a word in the articles of that text base. If the search query is too precise, much of the desired information may be missed. If it is too broad, the amount of hits may be overwhelming. For instance, the use of the two word query of "drug trials", in attempting to learn about emerging products in the pharmaceutical industry, would obtain search results that would include drug related criminal litigation and leave out pertinent reference where "drug testing" is used in text in place of "drug trials".

Known current awareness systems are easier to use than text search systems because they filter news and other information into defined categories. However, results with most such systems are limited to what falls into the search. If the literature search is for something that has no defined category, these systems are useless. Awareness systems that allow the use of custom queries can be as difficult to use as text search systems.

Another problem with both present day text search and awareness systems, is that they typically present results as a list of document titles, sometimes in chronological order and at other times by relevance. These facilities do not present the wealth of information found in searching in any organized way. Each document turned up by the search must be examined individually and read to see if it is truly pertinent. No source is treated as more important than or distinct from any other source. In other words, the appearance of the information on the screen is not organized for easy consumption.

In the past, information on related subject matter has been arranged in "books" to provide organization to the provided data. What has been proposed lacks sufficient control by the user over the content and appearance of the supplied information. In other words, the user is given prepackaged search results categorized as selected by the supplier of the book, and not the results of an independent search on a subject selected by the user.

OBJECTS OF THE INVENTION

Therefore, an object of this invention is to provide an improved system and method for displaying information on graphical user interfaces.

Another object of the invention is to structure and simplify the search while greatly improving the quality of the results.

Another object of this invention is to provide an improved system and method for organizing, displaying and managing the presentation of search results on a computer graphical user interface.

BRIEF DESCRIPTION OF THE INVENTION

The present invention provides a user interface that does much of the work in searching and organizing of search data. It defines search terms and sources ahead of time for subjects that have wide usage, or are suggested by the user. It then organizes search documents pertaining to a selected subject into a book divided into sections according to topics about the subject. Each section of the book is represented by a tab on the book that can be used to select between the topics in the book.

The books can be used to organize information from numerous sources about any number of subjects such as companies, products, industries, geographies and people. Standard books can be personalized to fit the users particular interest in the subject. For example, the content and organization of a book on a company can change depending on whether the user of the book owns the company's stock, competes with the company, or sells products to it. Preferably, the books will be automatically updated when an update event occurs, and provide an indication on the screen that an event has occurred.

BRIEF DESCRIPTION OF THE DRAWINGS

The present invention can best be understood from the following detailed description of one embodiment thereof while making reference to the accompanying figures of which:

FIGS. 3 to 11 are graphic presentations of computer screens in accordance with the present invention;

DETAILED DESCRIPTION OF THE INVENTION

Figure 1:
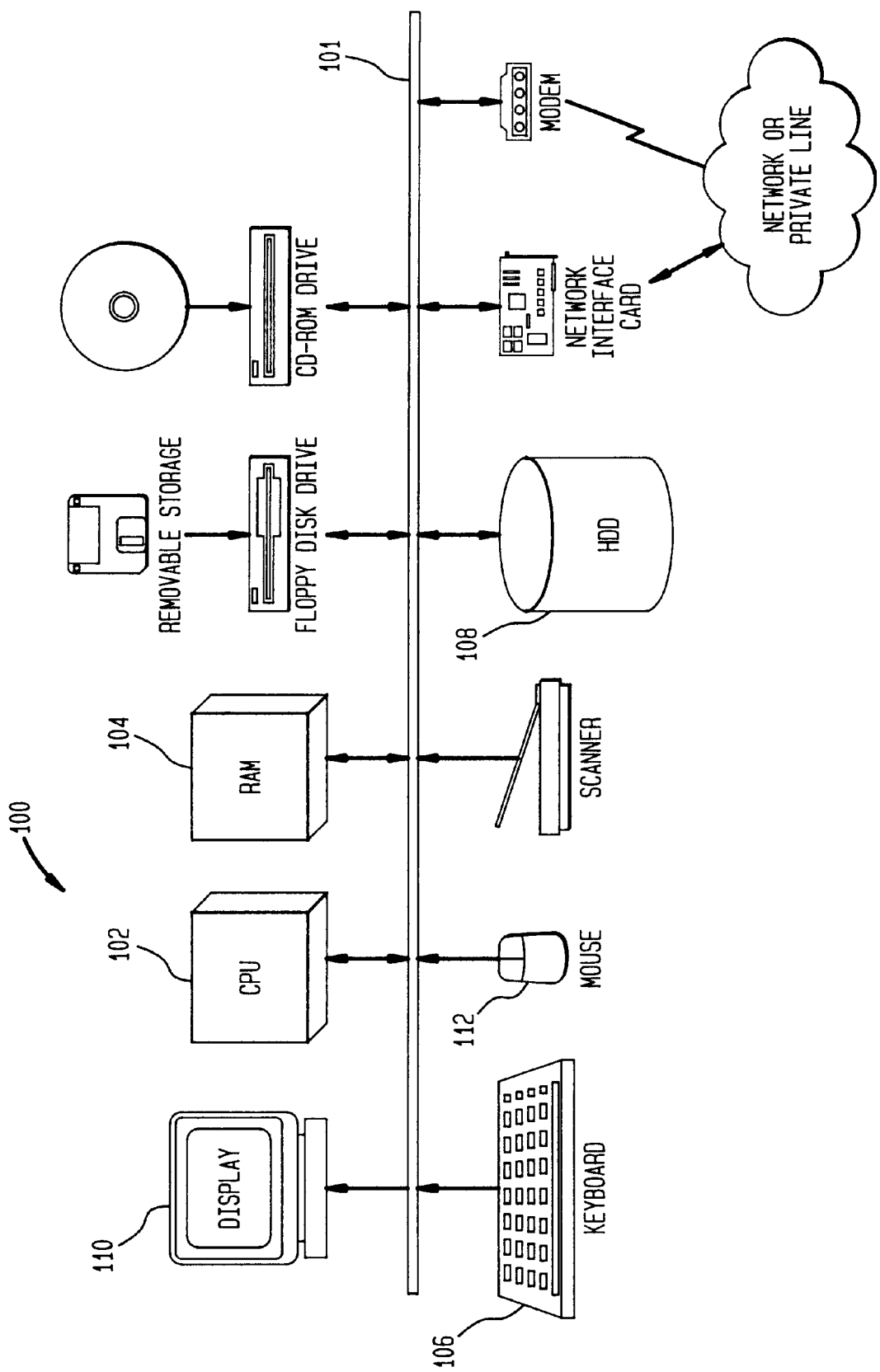
FIG. 1 is a block diagram of a computer for use with the present invention.

The present invention is capable of being used on any properly configured general purpose client computer system, such as the one shown in FIG. 1. Such a computer system 100 includes a processing unit (CPU) 102 connected by a bus 101 to a random access memory 104, a high density storage device 108, a keyboard 106, a display 110 and a mouse 112. An example of such a computer is an IBM Personal Computer of the International Business Machines Corporation, such as an Aptiva L31 Model with a 233 Mhz Pentium processor of Intel Corporation operating under Microsoft Windows 95 operating system of the Microsoft Corporation. Also required in this example is an internet browser capable at running Java such as Netscape Navigator, e.g., Netscape Communications Corporation, Internet Explorer, e.g. Microsoft Corporation.

Figure 2:
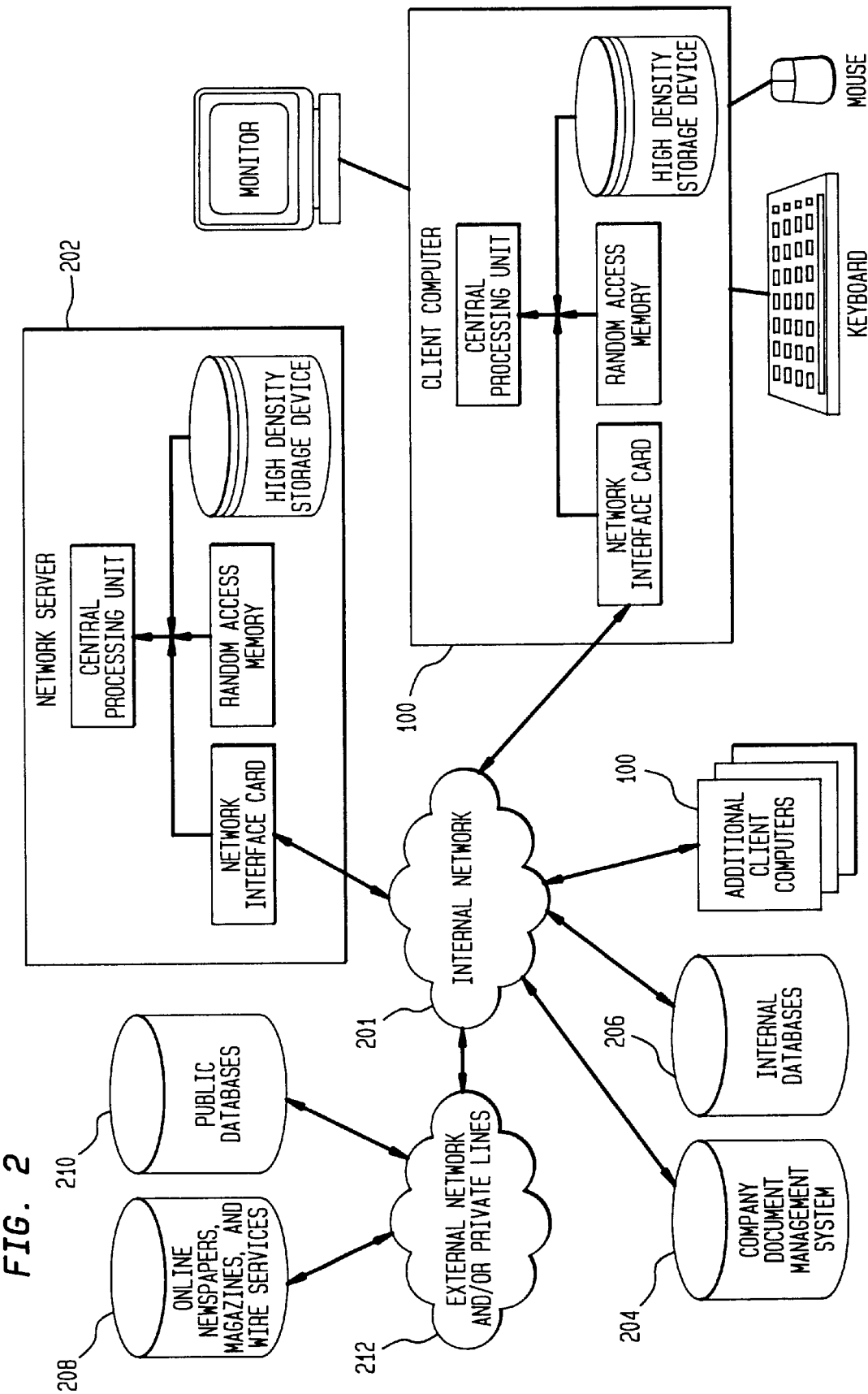
FIG. 2 is a block diagram of a network server computer system using the present invention including computers such as shown in FIG. 1, both the components internal and external networks and sources of the information.

As shown in FIG. 2, computers 100, such as the one described in FIG. 1, are connected in an internal network 200 with a server 202 so that the computers 100 can obtain information stored in the server 202 or from other internal sources. Examples of internal sources are company document management systems 204, or internal databases 206. External sources, such as on-line newspapers, magazines and wire services 208 and public databases 210, are accessible through external networks 212 (such as the internet or a sources private line).

The network server 202 may be wholly or partially dedicated to accumulating the information for the books. It can receive information off the internet 212 from external news sources 208, and public databases 210; combine that information with information from internal sources 204 and 206 obtained through the server 202; and use both that internal and external information to prepare the content of books to be delivered to users. A book with a different content can be provided to each of the individual users on the network based on information specified or selected by the user. Each user on the network may have information added or deleted on his or her copy of the book.

Figure 3:
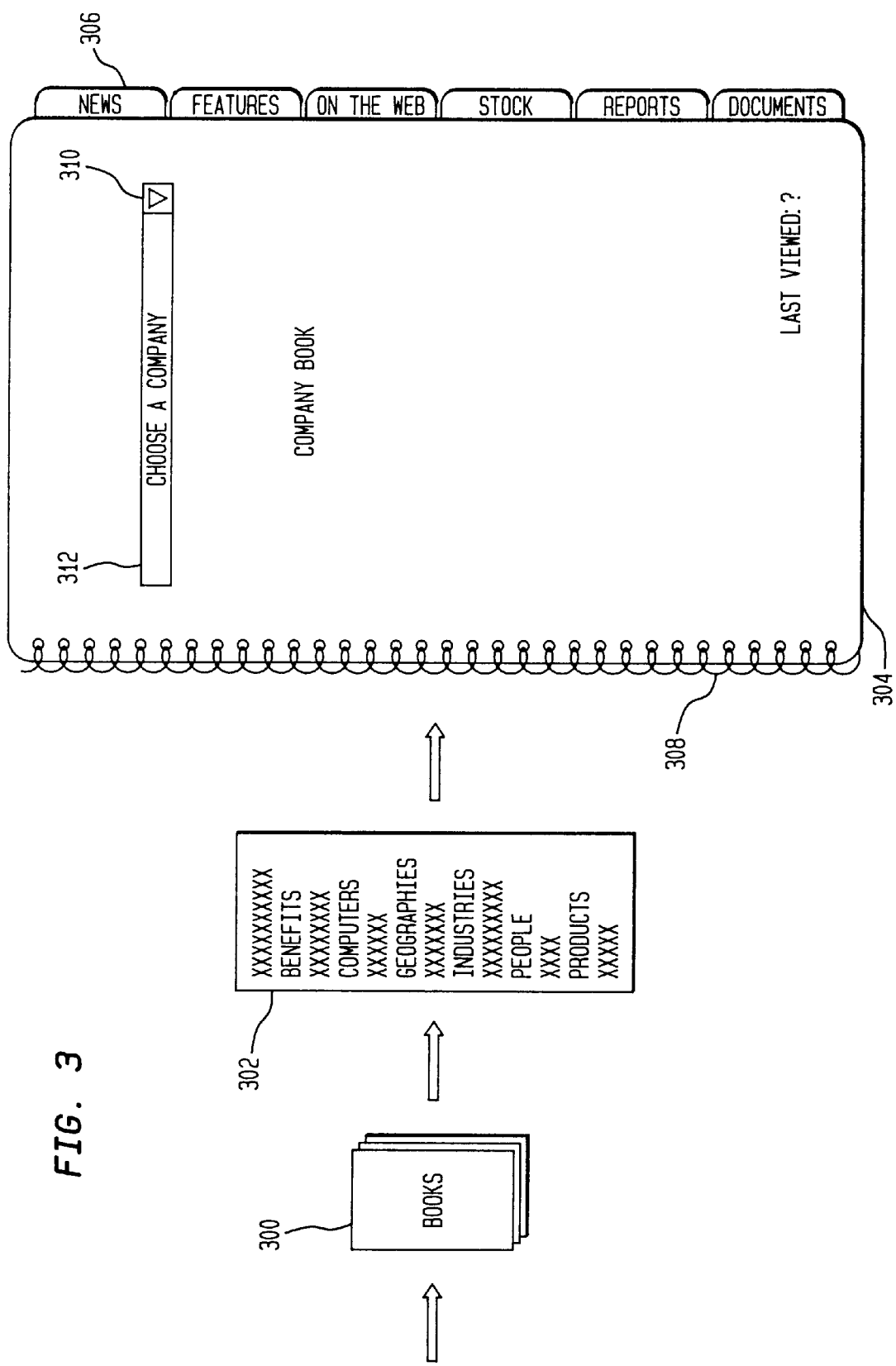

Referring now to FIG. 3, selection by the user of the book logo 300 on the display screen 110 of the computer 100 of FIG. 1 produces a list 302 of types of books to which the user of the computer has access or subscribes. The user may select any one of the books on the list, like the one for companies 304. As shown, the representation of the book includes tabs 306 on one edge thereof, and a spiral binding 308 on the opposite edge.

Figure 4:
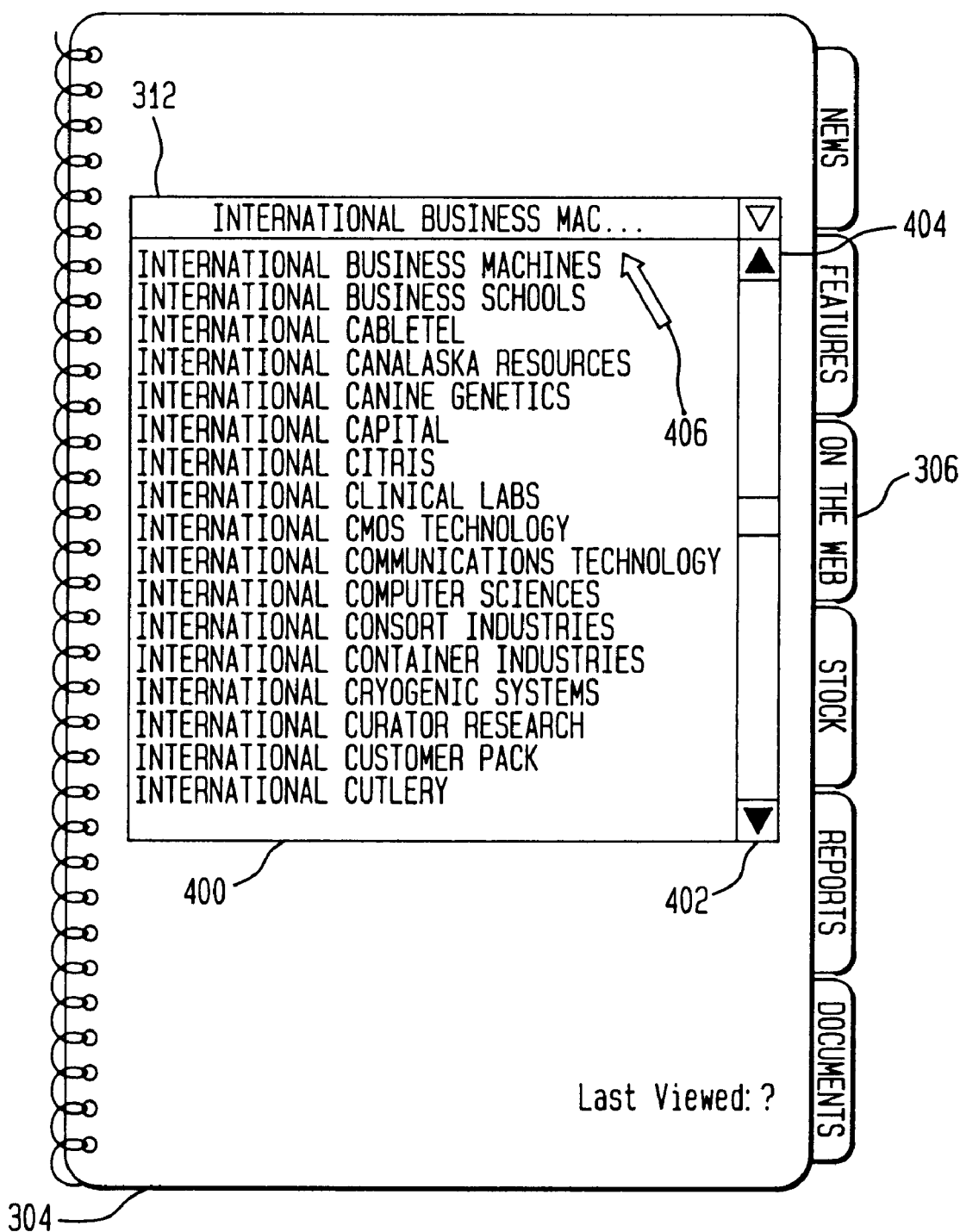
Figure 5:
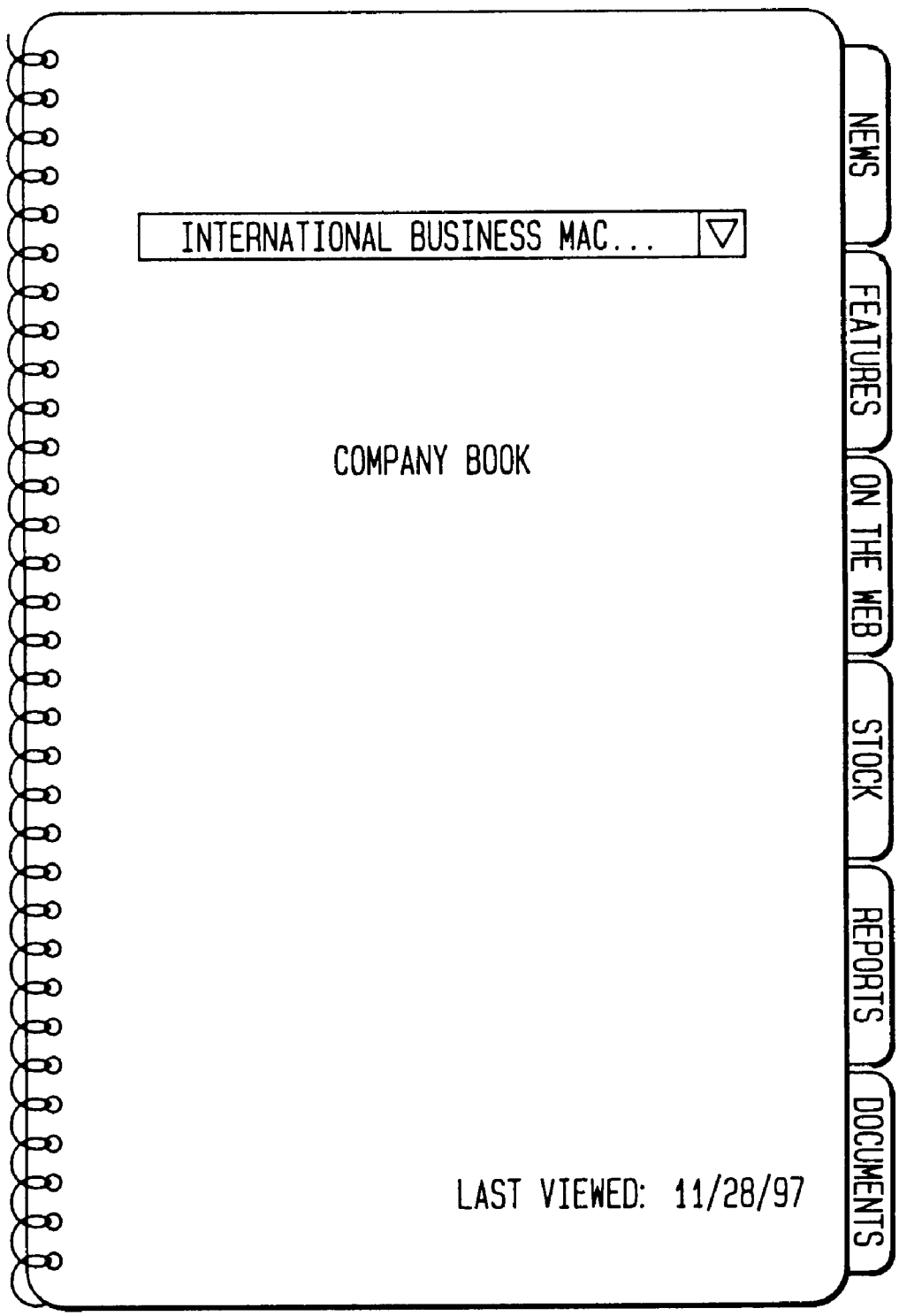

Selection of a user interface element such as down button 310 or typing in of a company name such as International Business Machines into space 312 on the "cover" of the book of FIG. 3, develops a listing, such as the one shown in FIG. 4, of books about companies that are available to the user. The names of companies, including IBM, appear in a scrollable frame 400 in alphabetical order. Selection of the scroll up or scroll down button 402 or 404 changes the listing of available books appearing in the frame. When the desired book is spotted, in this case International Business Machines Corporation, movement of the cursor 406 and activation of the mouse will, as shown in FIG. 5, produce a display on the cover of a book in space 312 of International Business Machines Corporation.

Figure 6:
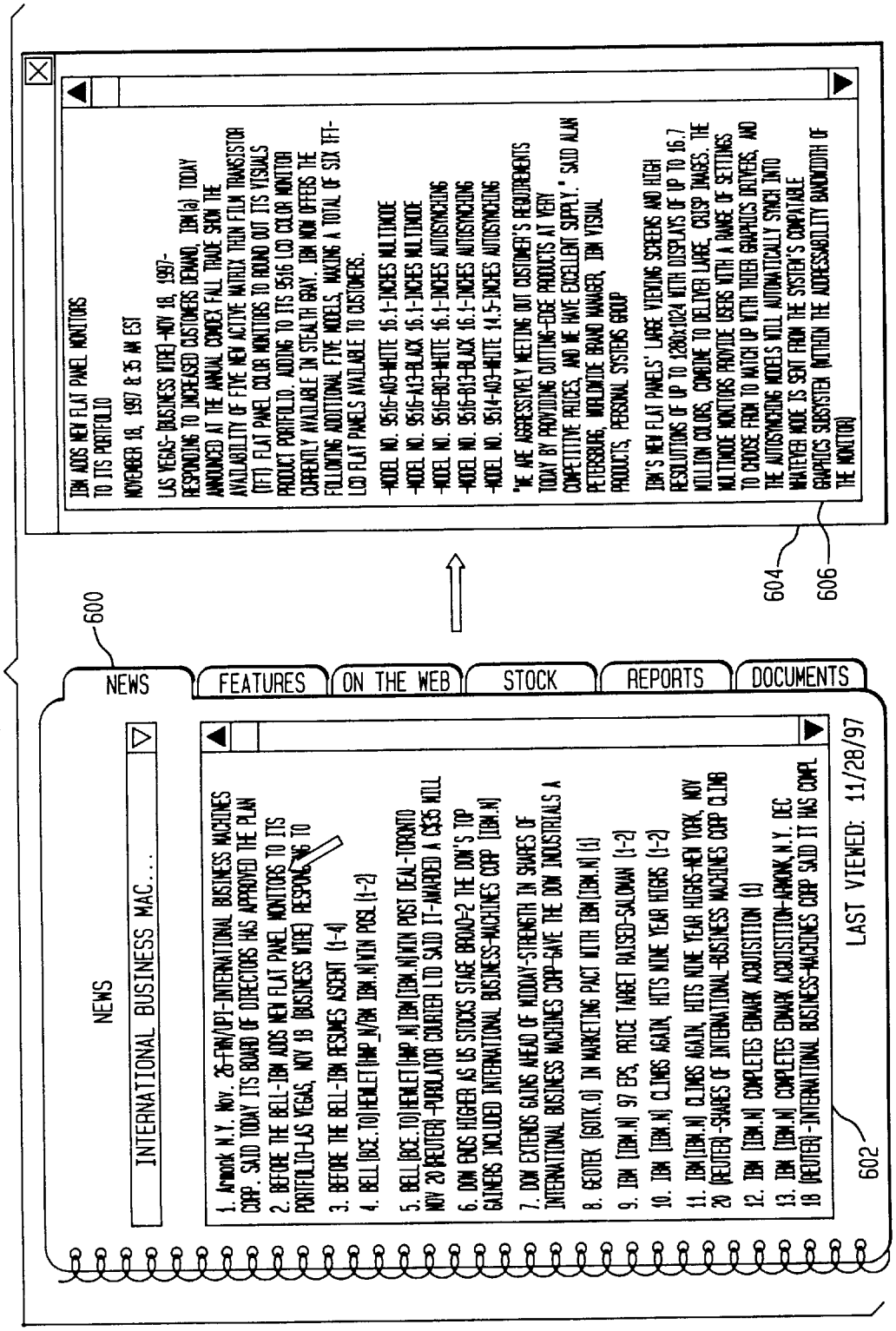

As shown in FIG. 6, selection of any tab with the mouse will provide a listing of search results that are applicable to the tab. For instance, selection of the news tab 600 will "open" the book to the news section. The fact that the book is open to the news section is indicated by the absence of a line between the news tab and the remainder of the book. The news section contains a listing of either news headlines or news articles about the company occurring within a previous time period of a duration preselectable by the user. Absent such a selection, a default time period of say six months is provided. Again, the listing for the articles are contained within a scrollable box 602 so that the number of articles is not limited by the space available on the page of the book. Selecting of any article, will produce a full text reproduction of the article, either within the scrollable box 602, or preferably in a separate box 604 alongside the briefing books display. This separate box 604 contains the articles in a scrollable frame 606, and includes the usual Windows type control buttons for manipulating the on screen presentation including that for expanding the size of the box to the point where the information in the box 604 is readable by the user. This expansion can be a full screen expansion covering over the displayed book. The news articles may be taken from any number of types of sources, such as the Reuters, Comtex, Intel X, Dow Jones, etc. news services. Consumers may contract in advance for access to those sources or could take advantage of pay-per-view services, such as infoMarket which uses Cryptolopes in its delivery mechanism.

Another section of the briefing book is one containing featured articles which articles would not be limited to the preselected time period for news articles, but may extend back for a longer period. This section could be an extension of the news category, or as shown in FIG. 7, be a separate category. This tabbed section could draw stories from large numbers of feature articles found in publications such as industry journals and trade magazines. Aggregators such as Information Access Company, UMI, and Philips Publishing could be providers of this information.

Figure 8:
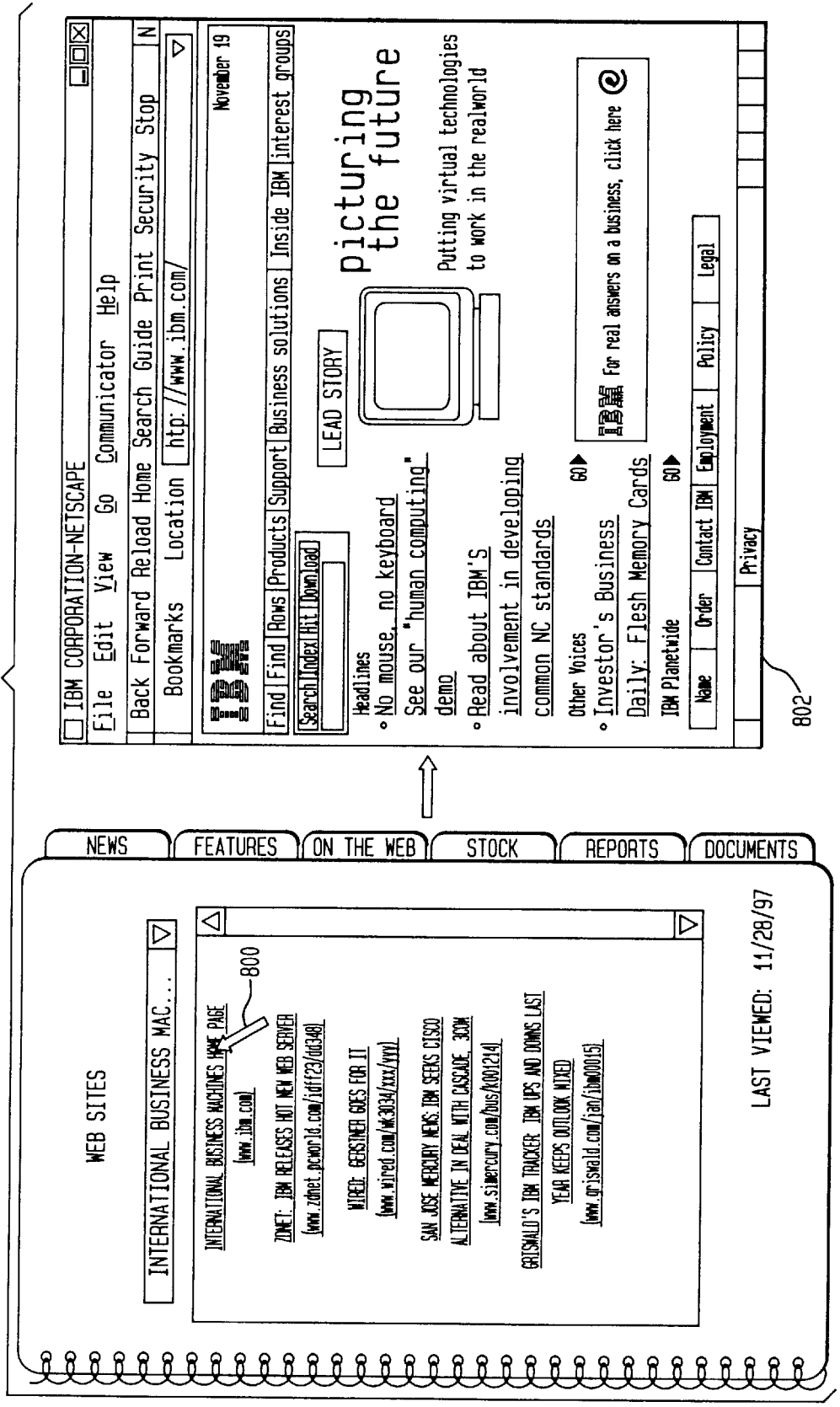

As shown in FIG. 8, another section of the book contains a listing of web sites with information about the company. Selection of one of the listed web sites, for instance, the International Business Machine home page, using a mouse cursor 800 to select from that listing, will automatically display the web site to present information contained therein on a separate Windows display 802 from an internet browser.

Figure 9:
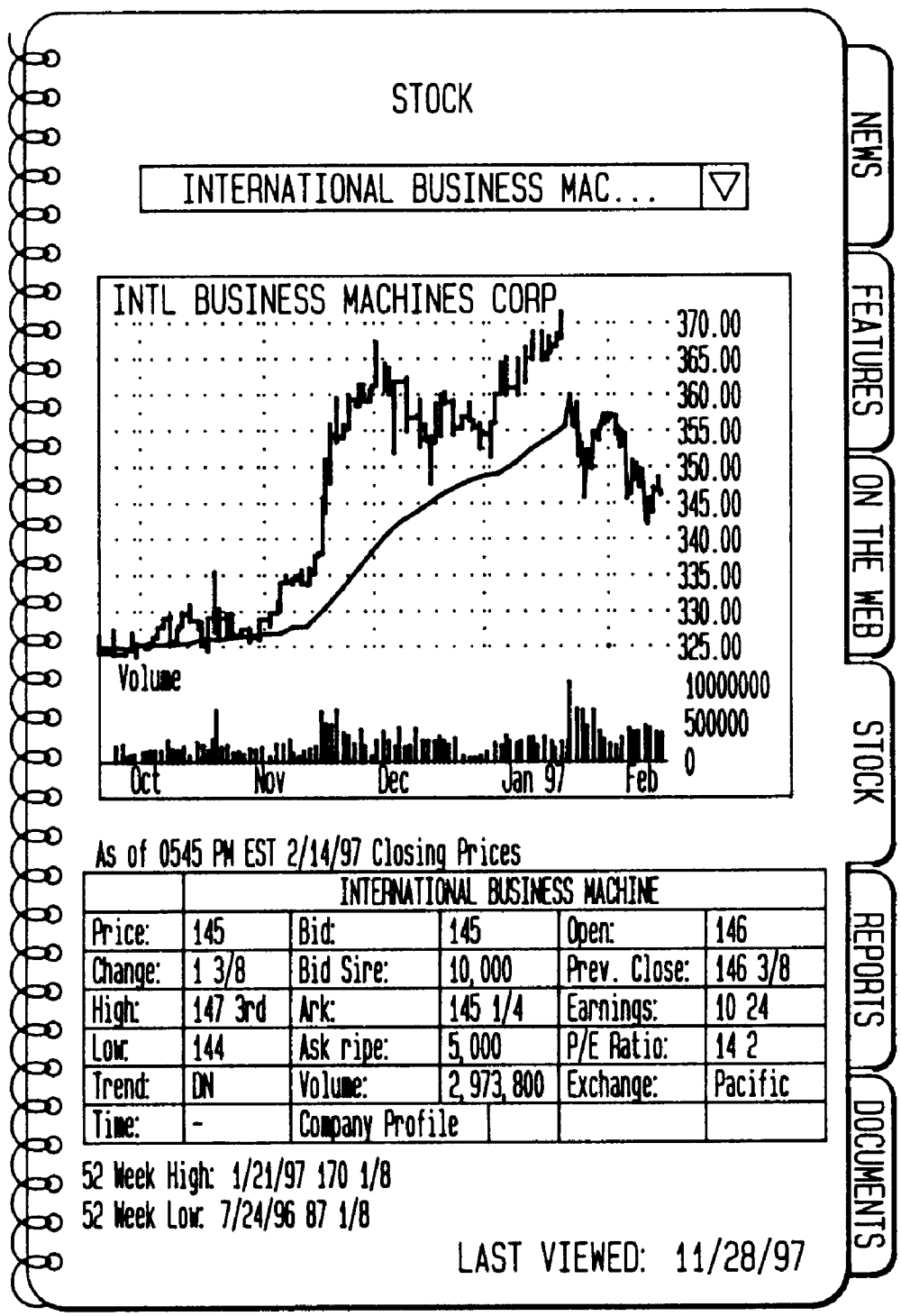

Another section of the book is a section on the company's finances listed under the "stock" tab. As shown in FIG. 9, this section includes charts showing the progress of the company's stock. It also includes earnings reports and other financial information of the company. Analysts reports of the company are also provided in this category.

Figure 10:
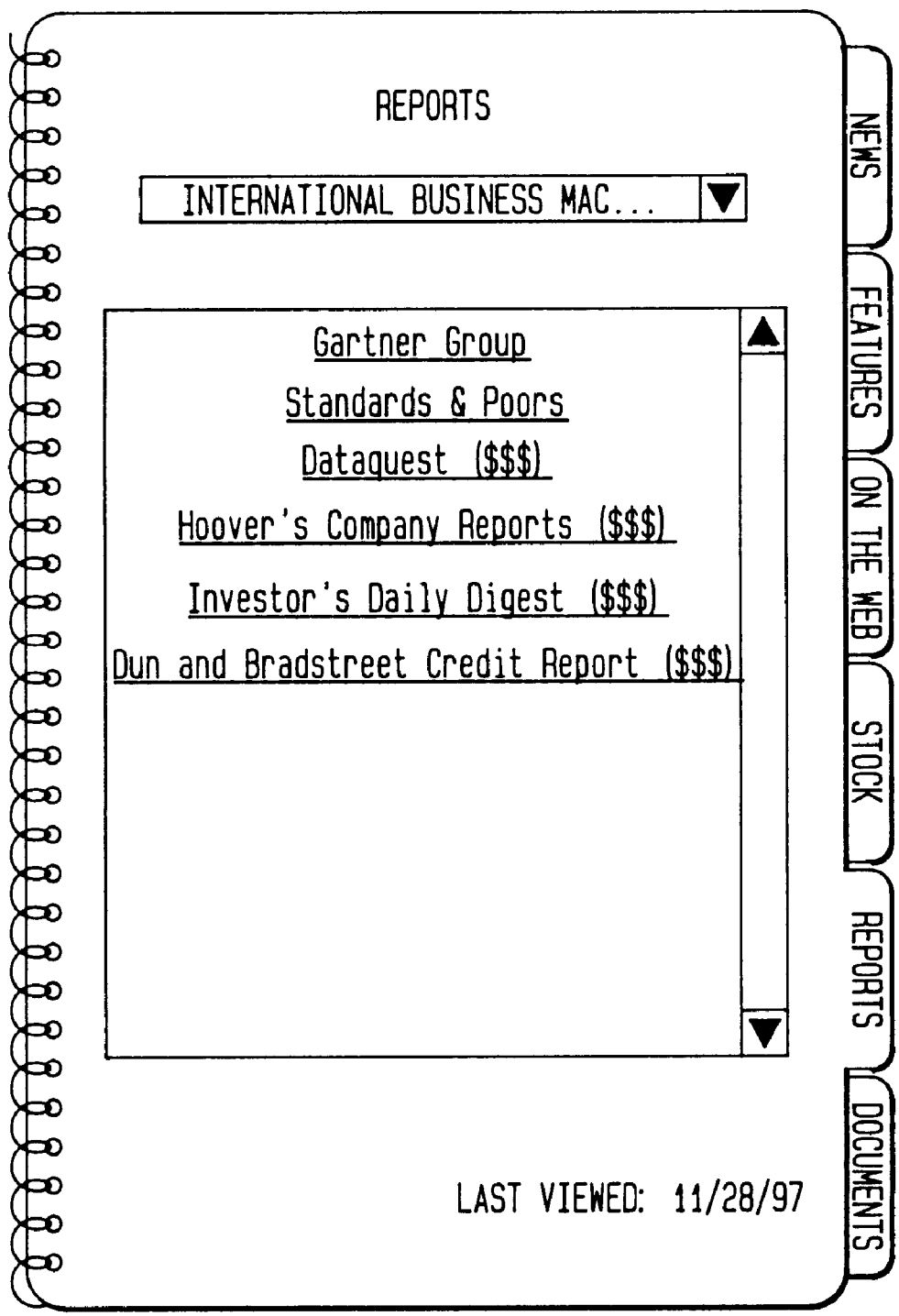

Under the section called "reports" shown in FIG. 10, copies of reports of standard well known sources that analyze corporation can be provided. Customers can choose which sources they wish to view by using a mouse. The reports can be provided on a pay-in-advance basis or offered on a pay-for-view basis. As shown, some of the possible sources are Standard & Poors and Hoover Company reports.

Figure 11:
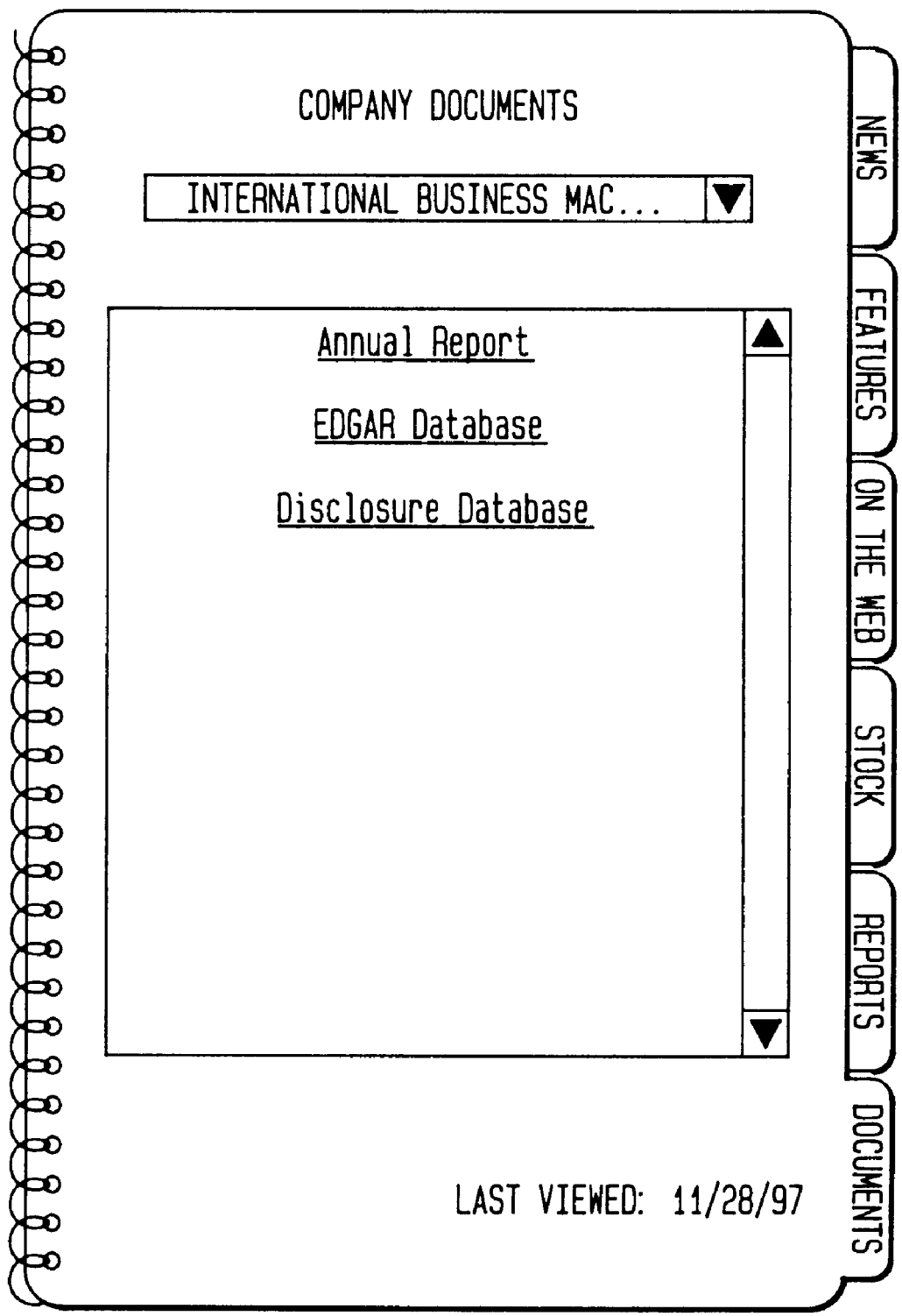

The section with tab "documents" shown in FIG. 11, provides a listing of documents issued by the company such as annual reports and Security and Exchange Commission filings. The reports can be drawn from disclosure on the internet at the Company's web site, or through the Edgar Database. As with the other sections, full text copies of the documents listed in FIGS. 10 and 11 are presented on the screen or hard copies thereof can be obtained in accordance with the internet browsers operating procedures. While a number of different tabbed sections have been illustrated, these are not all inclusive. Sections can be provided which contain all sorts of information. For instance, a listing of company's officers, telephone numbers of significance to the user and locations of company's business sites.

Internet browser compatible screens, such as the ones described for Windows 95, can be designed for any operating system using Java and HTML.

While books directed at corporations have been discussed, practically all subjects can be presented in computer book form. For instance, instead of covering one company, a book could cover a technology or a business field in toto, as shown in the listing of FIG. 3. As pointed out above, briefing books are configurable by the customer to include internal and external sources and those external sources can be freely available, site licensed, or available on a pay-for-view basis.

Figure 12:
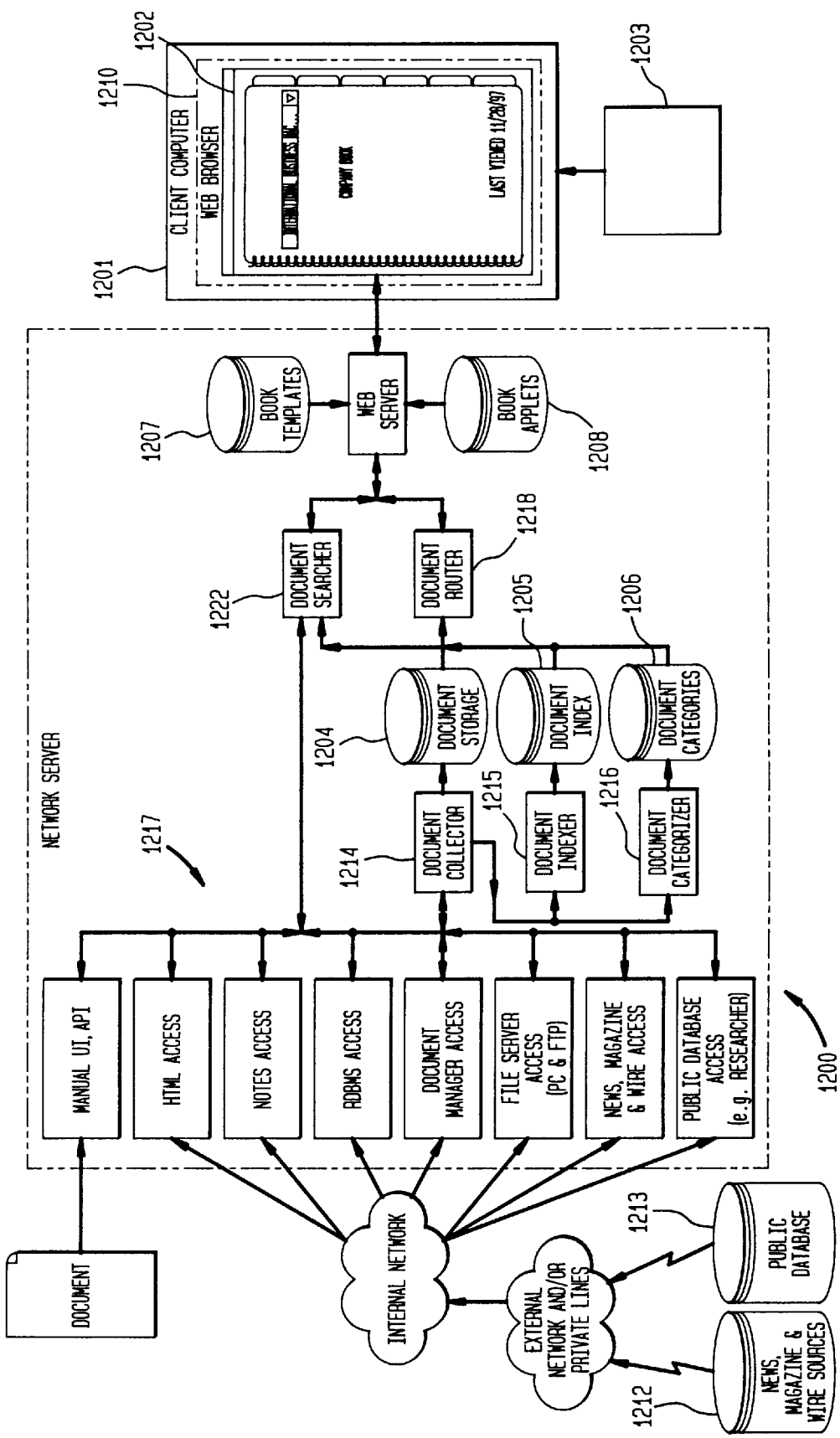
FIG. 12 is a block diagram of a search engine in accordance with the present invention.

Referring now to FIG. 12, the information search and retrieval system 1200 includes a computer system 1201 (such as the one described in connection with FIG. 1), with a display 1202 and user input device 1203 (such as the mouse and keyboard in FIG. 1). The data provided by the screens is stored in database 1204 to 1208 and provided on the display 1202 in response to control signals inputted by the user, on the input device 1203, through an operating system, and a wet browser application 1210 running on the operating system. In addition to information stored in the databases, the system includes means for providing information directly from outside document sources 1212 and 1213, such as the ones described in connection with FIGS. 3 through 11. They include a document collector 1214 and a document indexer 1215. The document collector provides documents to the databases 1204 directly from the document collector to document storage 1204, and indirectly to the document index storage 1205 and document category storage 1206 through the document indexer 1215 and document categorizer 1216, respectively. The document indexer 1215 indexes documents, stores indices of them in the database 1205. The document collector 1214 constantly checks the documents to see if the documents have been added to or updated. The documents collected to be presented in briefing books are indexed using a full text retrieval system and/or field oriented database techniques.

The documents placed in the database and accessible from the documents sources are categorized by the document categorizer 1216. Categorization is in accordance with the books and tabs on the displays of FIGS. 3 through 11. The document collection, indexing and categorizing functions can be performed by known software for those purposes. A document searcher 1213 provides data in response to the tab and document selections on the books by the user. The document searcher can either access databases 1204 thru 1206 to obtain the requested information, or can access various document sources 1212 and 1213 through the appropriate accessing components 1217. The document searcher program must be compatible with the indexer and categorizer programs, and can be performed by the same software program as the document indexer and categorizer. Such a unified program is Topic, a software program of Verity Inc.

The document searcher 1222 can be implemented using text retrieval technology, field oriented database technology or a combination of both. The only requirement is that it is compatible with the way the documents were indexed and categorized by the indexer and categorizing components. searching is transparent to the user. It appears to them as a simple selection of a subject category that retrieves the appropriate briefing book and subcategories therein.

The user through the user input device manipulates the presentations 1220 on the display 1202, as previously described in connection with FIGS. 3 to 11. In response to the selection of a type of book, the book itself and a topic in the book (through tab selection), the computer through a web server accesses book applet storage 1208 to obtain a Java language program to control the display of a briefing book. Once the program is resident in the client computer, it accesses the book template database 1207 to a request a book format. The book templates, in addition to the book presentation, contain search queries to populate the book sections. The queries are provided to the document searcher 1213 to obtain the appropriate information as previously described.

Documents are delivered automatically using the document router 1218. The document router delivers updates to books and their associated documents as changes occur. It also notifies the user of the update so he can review the book.

Figure 13:
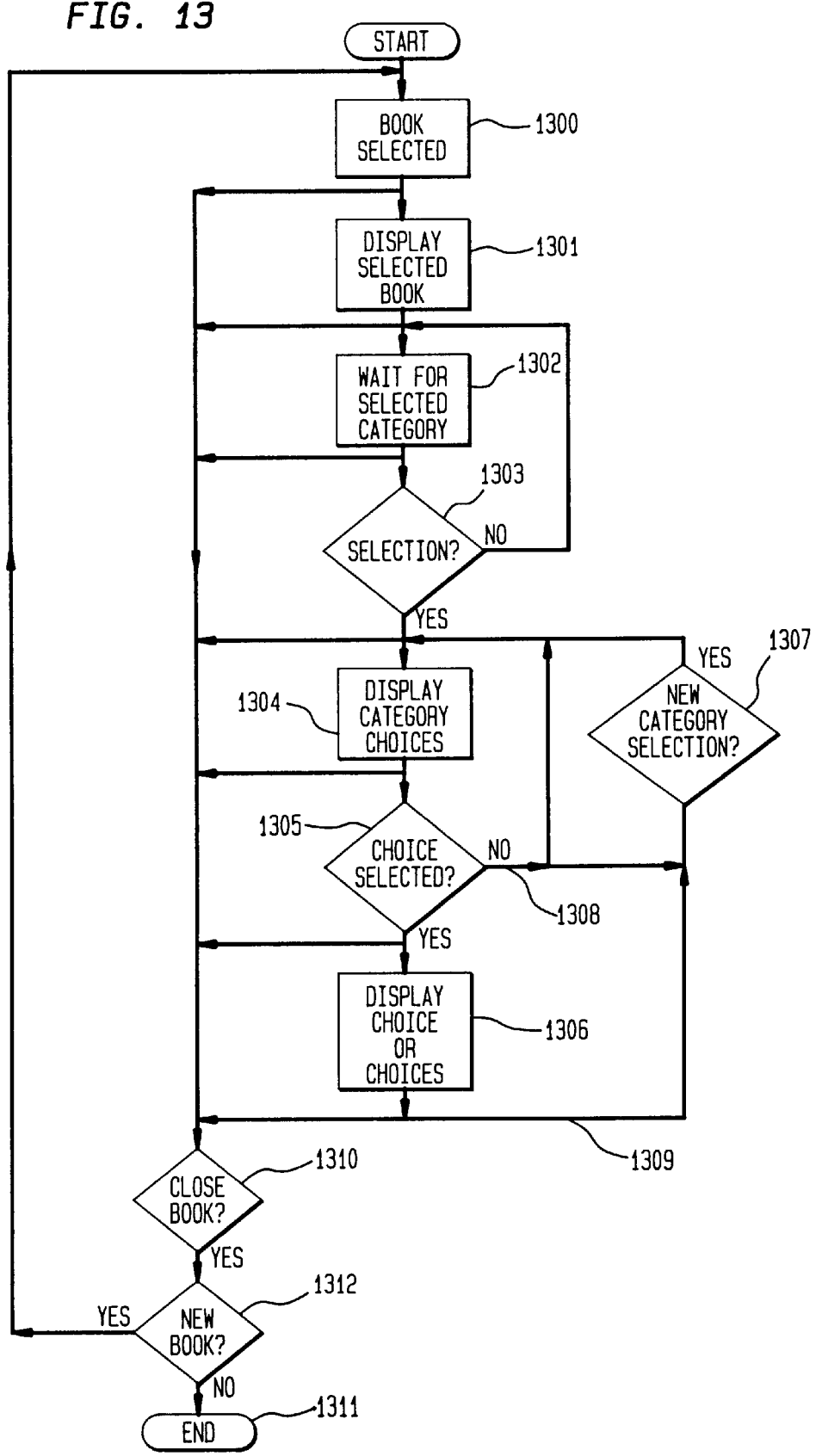
FIG. 13 is a flow diagram illustrating the operation in response to user selection of the computer screens of FIGS. 3 to 11.

Referring now to FIG. 13, when a book has been selected 1300, the book is displayed 1301 on the computer screen. After selection of a book, the system awaits 1302 the choosing of a category by the user selecting one of the tabs on the book. Once a tab has been selected 1303, a search is performed for the category and the category is displayed 1304 in the book format. The system then awaits 1305 selection of one or more of the described choices. With selection, the selected information is displayed 1306. The user can select a new category 1307 if the first selection was inappropriate, or has exhausted resources of a selected category 1309. Closing 1310 of the book to end 1311 the display or to select another book 1312 is a choice the user can make at any time during the process. Once a book has been closed, another book can be selected.

Above we have described one embodiment of the invention. It should be apparent from the above that the source of information in the book can be external or internal to the company. Internal company information can be drawn from web sites, full text databases, document management system, relational databases or any other computerized information. Users can search vast archives with a search and retrieval component to find the latest information. They do this by selecting the appropriate briefing book subject, and do not have to prepare a proper set of key words. Since the documents are presented in the described book form rather than just listed on the screen, the documents are organized to allow easy selection of documents of interest. By the use of a document router and a user awareness profile, the user can be notified each time a document of interest in the book is updated. The book may be used in combination with a clip board. The books can transform the information retrieved into a variety of popular formats so it can be used in documents and spreadsheets. Associated software can be used with the present invention. Word processors, such as Microsoft Word, Lotus Pro, and Corell Wordperfect are supportable. Spreadsheets are also supportable including Microsoft Xcel and Lotus 1 2 3. The user can incorporate text and data from the books and use such data in documents and spreadsheets to automatically update them.

Above we have described one embodiment of the invention, it should be apparent to those skilled in the art that many modifications of that embodiment are possible. Therefore, it is understood that the invention not limited to the above described embodiment but also covers all embodiments within the spirit and scope of the appended claims.

We claim:

1. A computerized method of searching and presenting information dispersed in various search sources having different organizational formats which sources are searched for information on a subject in particular search categories and subcategories, comprising the steps of:

automatically maintaining and updating an on-line database about the subject by extracting information in the particular search categories and subcategories from the various search sources;

providing for presentation on a computer controlled screen a representation of a book covering each search category, said representation including a plurality of indicia for dividing the presentation of each of the books into sections each section represented by one of the indicia, each such indicia representing either a searched source format or a search subcategory;

presenting to a user a personalized version of a selected book configurated to the interests of the user;

allowing the user to select any one of the indicia to view a section of the book covering search results in the source format or subcategory represented by said indicia;

responding to selection of an indicia by having a computer system issue a search through the on-line database for information in the selected section of the personalized version of the book; and responding to said selection of one indicia by displaying the search results of the selected section of the book whereby different versions of the book can be provided to different users.

2. The method of claim 1 including the step of including for selection by the user a multiplicity of external search sources from the group consisting of newspapers, journals, websites and government reports.

3. The method of claim 2 including the step of including headlines and headings of articles of the external sources in the book under an applicable indicia title.

4. The method of claim 3 including the step of providing for the selection of a full text display of an article represented by one of the headings or headlines when the user selects the headline.

5. The method of claim 4 including the step of removing headings and headlines from the book when they are older than a fixed period of time.

6. A computer program on a computer usable medium for performing a computer search through information on a plurality of subjects in various search sources having different organizational formats for information on a particular subject in search categories and subcategories, said computer program comprising:

database code for maintaining and updating an on-line database on the particular subject by extracting information in the search categories and subcategories;

display code for providing on a computer controlled screen a representation of a book covering a search category requested by the user, said representation having a plurality of indicia for dividing the presentation of information from the search sources into sections each section represented by one of the indicia each indicia representing a search source type or a search subcategory;

selection code for permitting a user to choose any one of the selected indicia to view search results in the section represented by the selected indicia;

search code for responding to the choice of an indicia for having a computer system perform a search through the database and the search sources with different information formats covering the chosen category and subcategories;

document management code for organizing code information retrieved from the searched sources in accordance with the indicia; and results code responsive to said selection for displaying in book form, on the screen, results that are limited to the information in the categories and subcategories requested.

7. The computer program of claim 6 wherein the document management code includes:

document collection code for checking data sources to obtain documents or references from data sources;

document indexing code for searching through said data sources; and document categorizing code for placing applicable data from said data sources into categories represented by said books and indices.

8. The computer software of claim 7 including code providing for selection by the user of a multiplicity of external sources from the group consisting of newspapers, journals, web sites and government reports.

9. The computer program of claim 8 wherein computer code for presenting headlines and headings of articles in the external sources.

10. The computer program of claim 9 including code for allowing the user to view in a full text display one of the articles represented.

11. The computer program of claim 10 where said full text display is in said representation of the book.

12. The computer program of claim 9 including editing code for a user of the computer system to make changes to the books contents.

13. The computer program of claim 12 wherein at least one of said subcategories represented by a indicia contains reference to pertinent web sites which are accessed by selecting said reference.

14. The computer program of claim 13 including access code for accessing a network of computers wherein at least one of said computers contains means for making entries into said representation of a book appearing on a display screen of another computer.

15. The computer program of claim 14 including transfer means to move information from the databases supporting the interface into other documents contained on a computer in the network of computers.

16. The computer software of claim 7 including automatic document routing code for providing documents related to said book provided automatically to user to update the book.

17. A computer system for searching and presenting information, randomly dispersed in documents of various search sources having different organizational formats, which sources are searched for information in particular search categories and subcategories comprising the steps of:

format means for providing on a screen a representation of a book covering the search category, said representation including a plurality of indicia dividing the presentation of information of the search category into sections each section represented by one of the indicia, each such indicia representing either a searched source format or a search subcategory;

configuration means for configuring the book to suit the interests of a particular user;

selection means for allowing the user to select any one of the preselected indicia in the configured book to view search results covering search results in the category and subcategory in the section represented by said indicia;

response means for responding to selection of an indicia by having a computer system issue a search through the search sources for information in the selected category and subcategories;

categorization means for categorizing information retrieved in accordance with the selected indicia; and display means for responding to said selection by displaying search results in said characterization of the book where information about a category is personalized to the particular user whereby personalized versions of a book covering the same category can be provided to different users.

18. The system of claim 17 including means for selection by the user a multiplicity of external search sources from the group consisting of newspapers, journals, websites and government reports.

19. The system of claim 17 including a document management means including:

document collection means for checking data sources to obtain documents or references from data sources;

document indexing means for searching through said data sources; and document categorizing means for placing applicable data from said data sources into categories represented by said books and indices.

20. A method of searching and presenting information on a subject in search sources containing both information related to and unrelated to the subject, comprising the steps of:

preparing a database of the subject;

continuously updating the database with information about the subject by automated computer searching on-line through a multiplicity of search sources containing information that is both related and unrelated to the subject, said search sources selected from the group consisting of newspapers, journals, websites and government reports;

dividing the information about the subject into preselected categories and subcategories;

providing on a screen a representation of a book covering the selected category, said representation having a plurality of indicia representing search source types and subcategories selectable by the user for dividing the presentation of information from the searched sources into segments each segment represented by one of the indicia, each such indicia representing a search source type or search subcategory; and configuring the representation of the book to the interests of a user;

responding to selection of an indicia by the user by displaying search results in said segment of the book represented by the selected indicia.

21. The method of claim 20 including the step of allowing the user to make changes to the book content.

22. The method of claim 20 wherein said subject is companies and said category is a particular company.

23. The method of claim 22 including notifying the user on the screen when there is a change in or addition to the book.

* * * * *